Figure 1:
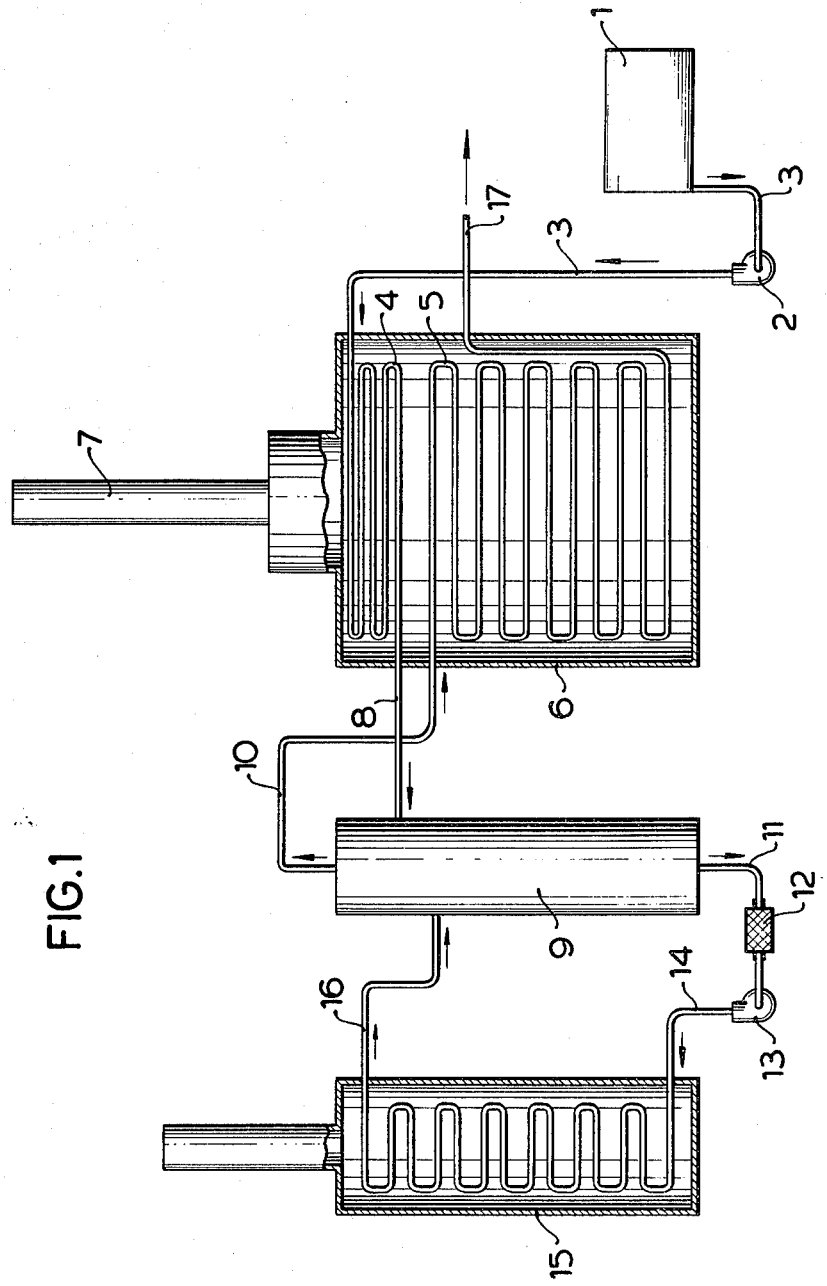

United States Patent [19]
Rechmeier et al.

[11] 3,903,182
[45] Sept. 2, 1975

[54] PRODUCTION OF VINYL CHLORIDE BY THERMAL CRACKING 1,2-DICHLOROETHANE

[75] Inventors: Gerhard Rechmeier, Hurth-Knapsack; Werner Mittler, Hermulheim; Rudolf Wesselmann, Sindorf, all of Germany

[73] Assignee: Hoechst Aktiengesellschaft, Frankfurt am Main, Germany

[22] Filed: Mar. 12, 1974

[21] Appl. No.: 450,437

[30] Foreign Application Priority Data
Mar. 16, 1973 Germany............................ 2313037

[52] U.S. Cl. ............................................. 260/656 R
[51] Int. Cl.² ......................................... C07C 21/06
[58] Field of Search ................................ 260/656 R

[56] References Cited
UNITED STATES PATENTS
2,724,006  11/1955  Krekeler et al. ................ 260/656 R
3,476,955  11/1969  Krekeler et al. ................ 260/656 R

*Primary Examiner*—D. Horwitz
*Attorney, Agent, or Firm*—Connolly and Hutz

[57] ABSTRACT

Production of vinyl chloride, wherein 1,2-dichloroethane is evaporated under pressure in an evaporation stage and resulting 1,2-dichloroethane in vapor form is thermally cracked at a temperature substantially within the range 450°–650°C with the resultant formation of vinyl chloride.

To this end, 1,2-dichloroethane is partially evaporated in the evaporation stage at a temperature substantially within the range 210°–250°C and under a pressure substantially within the range 20–35 atmospheres gauge; liquid 1,2-dichloroethane is separated in a separation stage from a mixture formed of liquid 1,2-dichloroethane and 1,2-dichloroethane in vapor form; the liquid 1,2-dichloroethane fractions are filtered and recycled to the evaporation stage, if desired in admixture with fresh 1,2-dichloroethane; 1,2-dichloroethane in vapor form, which escapes near the head of the separator, is introduced into the cracking reactor and thermally cracked therein.

8 Claims, 2 Drawing Figures

PRODUCTION OF VINYL CHLORIDE BY THERMAL CRACKING 1,2-DICHLOROETHANE

The present invention relates to a process for making vinyl chloride by subjecting 1,2-dichloroethane to thermal cracking at elevated temperature and under pressure.

As reported in U.S. Pat. No. 2,724,006, it is known that vinyl chloride can be produced by subjecting 1,2-dichloroethane to thermal cracking at temperatures substantially between 450° and 650°C and under pressures substantially between 20 and 35 atmospheres gauge. An exemplary embodiment of this process comprises completely evaporating in an evaporator liquid 1,2-dichloroethane under a pressure of 25 atmospheres gauge and at a temperature of about 300°C, passing the resulting vaporous matter through a heated tubular reactor and cracking 1,2-dichloroethane into vinyl chloride therein, at a cracking temperature of about 500°C. The gas mixture coming from the cracking reactor is cooled and vinyl chloride is separated therefrom by fractional distillation. To avoid side reactions during cracking, it is good practice in this process to thermally crack only a 40 to 70 weight % proportion of the 1,2-dichloroethane which is introduced into the cracking reactor. The partial cracking of 1,2-dichloroethane is a result of the fact that the vaporous matter introduced into the tubular cracking reactor is allowed to remain therein for a relatively short while, comprising a few seconds.

A further process for making vinyl chloride by subjecting 1,2-dichloroethane to incomplete thermal cracking in a cracking zone at elevated pressure, preferably between 8 and 40 atmospheres absolute, at temperatures substantially within the range 450° to 650°C, in the absence of catalysts, has been described in German patent No. 1,250,426, wherein gas mixture leaving the cracking zone and formed of vinyl chloride, hydrogen chloride, unreacted 1,2-dichloroethane and of by-products including low-boiling fractions boiling at a temperature lower and high-boiling fractions boiling at a temperature higher than 83°C (760 mm mercury), is partially condensed and subjected to a first distillation stage, in which the hydrogen chloride is distilled off, and to a second distillation stage, in which the vinyl chloride is distilled off, and of which the base product is either immediately subjected to a last distillation stage, of which the base product, formed of high-boiling fractions, is expelled and of which the head product, formed of a mixture comprising unreacted 1,2-dichloroethane and low-boiling fractions, is cooled and liquefied thereby, expelled and mixed thereafter with fresh 1,2-dichloroethane, and the resulting mixture is recycled into the cracking zone, or wherein the base product of the second distillation stage is freed in conventional manner from the low-boiling fractions by distilling it and the remaining mixture, formed of high-boiling fractions and unreacted 1,2-dichloroethane, is subjected to the last distillation stage, of which the base product, formed of high-boiling fractions, is expelled and of which the head product, formed of unreacted 1,2-dichloroethane, is cooled and liquefied thereby, expelled and mixed thereafter with fresh 1,2-dichloroethane, and the resulting mixture is recycled into the cracking zone, which process comprises drawing off a portion of vinyl chloride expelled at the head of the second distillation stage and liquefied, and re-pumping that vinyl chloride portion approximately to the center portion of the first distillation stage, in which the hydrogen chloride is distilled off.

German Pat. No. 1,250,426 is noted to describe an evaporation process different from that described in U.S. Pat. No. 2,724,006. In the German patent, liquid 1,2-dichloroethane is evaporated and thereafter cracked thermally into vinyl chloride in one and the same tubular reactor, whereas the U.S. patent provides for the use of an evaporator and a cracking furnace, which are spaced apart from one another and in which the evaporation and cracking steps are achieved separately.

These known processes are not fully satisfactory, however, in view of the fact that carbonized material has been found to deposit particularly in the evaporator and cracking furnace, which are required to be cleaned after approximately five weeks, this making it necessary to discontinue operation. To free the tubular cracking reactor from carbonized material, it is necessary for it to be burned out with air over a period of approximately 36 hours. Investigations have shown that carbonization occurs predominantly in the evaporator, if it is spaced apart from the cracking zone, or in the evaporation zone within the tubular reactor, if liquid 1,2-dichloroethane is directly admitted thereto.

In accordance with the present invention, we provide a process, wherein the adverse effects described hereinabove are avoided and wherein a portion of the 1,2-dichloroethane is used for effecting continuous self-cleaning of the evaporation zone.

The process of the present invention for making vinyl chloride, wherein 1,2-dichloroethane is evaporated under pressure in an evaporation stage, resulting vaporous matter is introduced into a heated cracking reactor, the vaporous matter being superheated in the heating zone within the reactor and being cracked incompletely in the reaction zone downstream of the heating zone in the reactor at a temperature substantially within the range 450°–650°C with the resultant formation of vinyl chloride, and wherein the vinyl chloride is separated from hot cracking gas mixture, comprises more particularly partially evaporating 1,2-dichloroethane in the evaporation stage at a temperature substantially within the range 210°–250°C and under a pressure substantially within the range 20–35 atmospheres gauge; separating in a separation stage liquid 1,2-dichloroethane from a mixture formed of liquid 1,2-dichloroethane and 1,2-dichloroethane in vapor form; filtering the said liquid 1,2-dichloroethane and recycling it to the evaporation stage, if desired in admixture with fresh 1,2-dichloroethane; introducing 1,2-dichloroethane in vapor form, which escapes near the head of the separator, into the cracking reactor and thermally cracking the 1,2-dichloroethane in vapor form therein.

A preferred feature of the process of the present invention comprises partially evaporating 1,2-dichloroethane in the evaporation stage at a temperature substantially within the range 230°–235°C and under a pressure substantially within the range 25–28 atmospheres gauge. It is more particularly advantageous to evaporate between about 30 and 70 weight %, preferably between 50 and 60 weight %, of liquid 1,2-dichloroethane which is introduced into the evaporation stage.

A further advantageous feature of the present invention provides for the evaporation stage and the cracking reactor to be accomodated in a furnace unit, and for the evaporation stage to be placed above, near the off-gas outlet of, the cracking reactor, and for the evaporation stage and the cracking reactor to be connected to one and the same heating source.

A further modified feature of the process of the present invention comprises introducing liquid 1,2-dichloroethane into a preliminary heating zone and heating it therein under a pressure substantially within the range 20–30 atmospheres gauge to a temperature substantially within the range 180°–200°C; flowing the preheated liquid material through the separator; removing 1,2-dichloroethane near the bottom of the separator, filtering it, delivering it to the evaporation stage and partially evaporating it therein.

In this latter case, it is possible for the preliminary heating zone and cracking reactor to be accomodated in a furnace unit, and for the preliminary heating zone to be placed above, near the off-gas outlet of, the cracking reactor, and for the preliminary heating zone and the cracking reactor to be connected to one and the same heating source.

A still further feature of the process of the present invention provides for the preliminary heating zone, the evaporation zone and the cracking reactor to be accomodated in a furnace unit, and to be connected to one and the same heating source.

Cracked gas coming from the cracking reactor can be made into vinyl chloride in known manner, for example in the manner described in German Pat. No. 1,250,426. The steps necessary to achieve this do not form part of the present invention.

By the steps comprising partially evaporating 1,2-dichloroethane in the evaporation stage and introducing 1,2-dichloroethane in vapor form into the cracking reactor, it is possible in the process of this invention considerably to reduce coking, which is highly desirable in the art. The fact that liquid phase material is present together with vapor phase material in the evaporation stage makes it impossible for any carbonized material, which is separated and removed from the liquid phase in a filtering means, to deposit on, and adhere to, the walls of the evaporator. In other words, use is made of a "self-cleaning" evaporation stage, which manifests itself in only minor coking inside the cracking reactor. As a result of this, the reactor and unit equipment downstream thereof, including distillation columns and condensers, are not likely to become clogged over prolonged periods of time. The cracking reactor has more particularly been found to permit continuous operation over a period of approximately one year, without the need for shutdown. In those cases in which use was made of the above prior art processes, it was necessary for the cracking reactor to be cleaned after approximately 5 weeks, due to coking.

A further beneficial effect of the process of the present invention, which adds to reduced coke formation in the evaporation stage and in the cracking reactor, resides in the fact that vinyl chloride of improved purity can be recovered from the cracking gas. To demonstrate this, hot cracking gas was worked up under identical conditions, and vinyl chloride was recovered therefrom once in accordance with prior art methods and once in accordance with this invention. Vinyl chloride produced in known manner was found to be contaminated with the following by-products:

| | |
|---|---|
| monovinylacetylene | 7 ppm (parts per million) |
| butadiene | 25 ppm |
| isobutane | 2 ppm and |
| methyl chloride | 85 ppm. |

These are contaminants which interfere with the polymerization of vinyl chloride. It is therefore highly desirably to have vinyl chloride containing a minimum of by-products, this being made possible by the process of the present invention, which adds to improving the purity of, and produces, vinyl chloride containing:

| | |
|---|---|
| monovinylacetylene | none |
| butadiene | ≦ 10 ppm |
| isobutane | none |
| methyl chloride | 40 ppm |

The prolonged operation periods rendered possible by the process of the present invention enable substantial economies in the cleaning costs to be effected and the production plant capacity to be increased considerably.

As a result, it has been possible for the shutdown periods of a plant, which normally comprised approximately 30 days/year, to be reduced to 2–4 days.

The process of the present invention will now be described with reference to the flow schemes shown in FIGS. 1 and 2 of the accompanying drawings. Needless to say the invention is not limited thereto.

As shown in the flow scheme of FIG. 1, a mixture of 1,2-dichloroethane coming from a mixing vessel 1, in which fresh 1,2-dichloroethane is mixed with 1,2-dichloroethane recovered in the work up of the cracking gas, is conveyed by means of a pump 2 and via a conduit 3 to a preliminary heating zone 4 and heated therein under a pressure of 27 atmospheres absolute, for example to a temperature of approximately 180°C. The preliminary heating zone, which is a tubular coil, and a cracking reactor 5 are accomodated in a furnace 6 heated by means of gas or fuel oil. Hot gas and effluent gas, respectively, are allowed to escape through a chimney 7. Preheated liquid 1,2-dichloroethane travels through a conduit 8 to a separator 9 and is removed therefrom through a conduit 11. After filtration in filtering means 12, the liquid 1,2-dichloroethane is delivered by means of a pump 13 and via a conduit 14 to an evaporator 15, in which it is partially evaporated. Resulting vaporous matter is removed through a conduit 16, freed in separator 9 from liquid 1,2-dichloroethane, which may have been carried along, introduced through a conduit 10 into cracking reactor 5, and thermally cracked therein.

Hot cracking gas is removed from cracking reactor 5 through a conduit 17 and delivered to a condensation and distillation facility (not shown in the drawing), in which vinyl chloride is separated in known manner.

The operation described with reference to the flow scheme shown in FIG. 1 can be simplified. This is shown in the flow scheme of FIG. 2. 1,2-dichloroethane coming from a mixing vessel 20 is delivered by means of a pump 21 and via a conduit 22 to an evaporation stage 23, in which it is heated under a pressure of 28 atmospheres abs. for example, to a temperature approximately of 240°C and partially evaporated therein. The evaporation stage 23, which is a tubular coil, and a cracking reactor 24 are accomodated in a furnace 25 heated by means of gas or fuel oil, the evaporation stage being heated by means of hot gas coming from a chimney 26. Subjecting 1,2-dichloroethane to partial evaporation results in the formation of a vaporous matter/liquid matter-mixture which is delivered through a conduit 27 to a separator 28 and separated into its components therein, vapor phase material being removed near the head of separator 28 and being introduced through a conduit 29 into cracking reactor 24. Liquid phase material, which is removed from separator 28 through a conduit 30, is filtered in filter 31, delivered through a conduit 32 to a pump 33 and repumped through a conduit 22 to the evaporation stage 23. Cracking gas mixture produced in cracking reactor 24 is removed therefrom through a conduit 34 and delivered to a condensation and distillation facility (not shown in the drawing), in which vinyl chloride is separated in known manner, for example in the manner described in German Pat. No. 1,250,426.

EXAMPLE 1

32,400 kg of 1,2-dichloroethane was introduced, in the manner described in FIG. 1, into preliminary heating zone 4 and heated therein to 185°C under a pressure of 28 atmospheres absolute. The 1,2-dichloroethane so heated was passed through separator 9 and delivered to evaporation stage 15, which was also fed with the same quantity of 1,2-dichloroethane under circulation, and in which the dichloroethane mixture was evaporated at a rate of approximately 50% at a temperature of 240°C and under a pressure of 27 atm. abs. The resulting vaporous matter/liquid matter-mixture was separated into its components in separator 9. Vapor phase material was introduced into cracking reactor 5 and a 50% fraction thereof was thermally cracked therein at 500°C, under a pressure of 27 atm. abs. and within 11 seconds, whereas liquid phase material was removed through the base portion of separator 9, filtered in filtering means 12 and evaporated once again in evaporation stage 15. The cracking gas coming from the cracking reactor had a temperature of 500°C. 10,000 kg/h of purified vinyl chloride containing 10 ppm of butadiene and 40 ppm of methyl chloride contaminants could be separated therefrom. The evaporation stage and cracking reactor, and the vinyl chloride separation and purification means, which were arranged downstream thereof, were found to admit continued operation over a period of 12 months.

EXAMPLE 2

Figure 2:
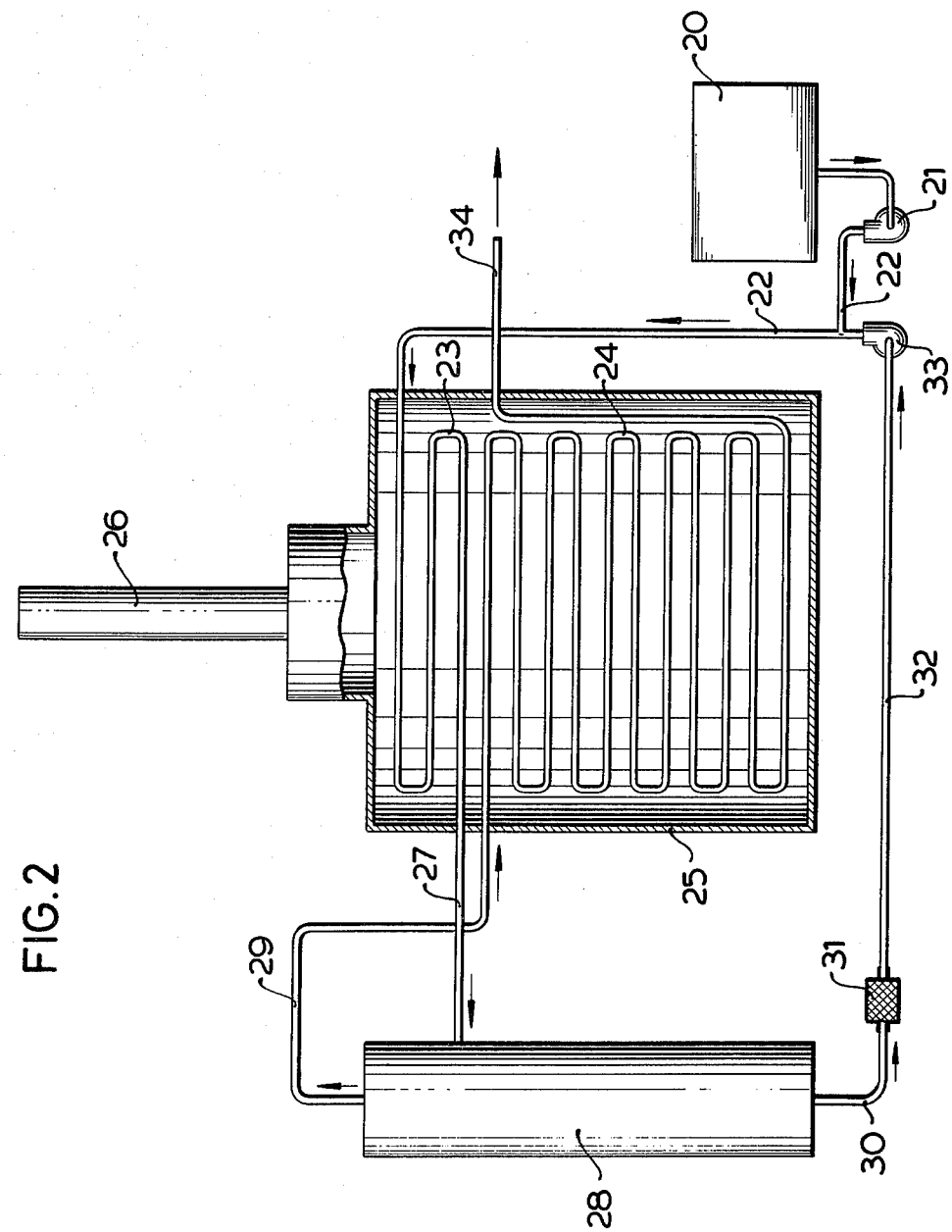

64.8 metric tons of 1,2-dichloroethane was pumped in the manner described in FIG. 2 into evaporation stage 23 and evaporated therein at a rate of 50% at 240°C and under der pressure of 27 atm. absolute. The quantity of 1,2-dichloroethane, which was supplied to the evaporation stage, comprised equal parts of fresh material and cycled material. The resulting vaporous matter/liquid matter-mixture was delivered to separator 28 and separated therein into vapor phase material and liquid phase material, the vapor phase material being delivered through conduit 29 to cracking reactor 24, in which a 50% amount of 1,2-dichloroethane was cracked at 500°C, under a pressure of 27 atm. abs. and within 11 seconds. The cracking gas coming from reactor 24 had a temperature of 500°C. 10,000 kg/h of purified vinyl chloride containing at most 10 ppm of butadiene and 40 ppm of methyl chloride contaminants could be separated therefrom. Liquid phase material which was obtained in separator 28, was filtered and repumped by means of pump 33 to evaporation stage 23, through conduits 32 and 22.

The evaporation stage and cracking reactor, and the vinyl chloride separation and purification means, which were arranged downstream thereof, were found to admit continued operation over a period of 12 months.

We claim:

1. In the process for making vinyl chloride, wherein 1,2-dichloroethane is evaporated under pressure in an evaporation stage, resulting vaporous matter is introduced into a heated cracking reactor, the vaporous matter being superheated in the heating zone within the reactor and being cracked incompletely in the reaction zone downstream of the heating zone in the reactor at a temperature substantially within the range 450°–650°C with the resultant formation of vinyl chloride, and wherein the vinyl chloride is separated from hot cracking gas mixture, the improvement which comprises partially evaporating a proportion substantially within the range of 30–70 weight–% of 1,2-dichloroethane in the evaporation stage at a temperature substantially within the range 200°–250°C and under a pressure substantially within the range 20-35 atmospheres gauge; separating in a separation stage liquid 1,2-dichloroethane and 1,2-dichloroethane in vapor form; filtering the said liquid 1,2-dichloroethane and recycling it to the evaporation stage; introducing 1,2-dichloroethane in vapor form, which escapes near the head of the separator, into the cracking reactor and thermally cracking the 1,2-dichloroethane in vapor form therein.

2. The process as claimed in claim 1, wherein 1,2-dichloroethane is partially evaporated in the evaporation stage at a temperature approximately within the range 230°–235°C and under a pressure substantially within the range 25–28 atmospheres gauge.

3. The process as claimed in claim 1, wherein the evaporation stage and the cracking reactor are accomodated in a furnace unit, the evaporation stage being placed above, near the off-gas outlet of, the cracking reactor, and the evaporation stage and cracking reactor being connected to one and the same heating source.

4. The process as claimed in claim 1, wherein liquid 1,2-dichloroethane is introduced into a preliminary heating zone and heated therein under a pressure substantially within the range 20–30 atmospheres gauge to a temperature substantially within the range 180°–200°C, the preheated liquid material is passed through the separator, 1,2-dichloroethane is removed near the bottom of the separator, filtered, delivered to the evaporation stage and partially evaporated therein.

5. The process as claimed in claim 4, wherein the preliminary heating zone and cracking reactor are accomodated in a furnace unit, the preliminary heating zone being placed above, near the off-gas outlet of, the cracking reactor, and the preliminary heating zone and cracking reactor being connected to one and the same heating source.

6. The process as claimed in claim 4, wherein the preliminary heating zone, the evaporation stage and the cracking reactor are accomodated in a furnace unit and connected to one and the same heating source.

7. The process as claimed in claim 1, wherein the liquid 1,2-dichloroethane is filtered and recycled in admixture with fresh 1,2-dichloroethane to the evaporation stage.

8. The process as claimed in claim 1, wherein a portion substantially within the range 50–60 weight% of 1,2-dichloroethane introduced into the evaporation stage is evaporated therein.

* * * * *